United States Patent [19]

Riedlinger

[11] Patent Number: 4,639,904
[45] Date of Patent: Jan. 27, 1987

[54] SONIC TRANSMITTERS

[75] Inventor: Rainer Riedlinger, Karlsruhe, Fed. Rep. of Germany

[73] Assignee: Richard Wolf GmbH, Fed. Rep. of Germany

[21] Appl. No.: 823,642

[22] Filed: Jan. 29, 1986

[30] Foreign Application Priority Data

Mar. 22, 1985 [DE] Fed. Rep. of Germany ....... 3510341

[51] Int. Cl.$^4$ ............................................. H04R 1/34
[52] U.S. Cl. .................................... 367/140; 367/150; 367/151; 367/103; 310/335
[58] Field of Search ............... 367/103, 138, 140, 151, 367/155, 157, 165, 150; 310/334, 335; 181/206

[56] References Cited

U.S. PATENT DOCUMENTS

4,319,490  3/1982  Hartmann ........................... 310/335

Primary Examiner—Charles T. Jordan
Assistant Examiner—John W. Eldred
Attorney, Agent, or Firm—Hill, Van Santen, Steadman & Simpson

[57] ABSTRACT

A sound transmitter for generation of transient acoustic pulses, comprising a spatially curved focussing emitter surface which is represented by the area of a single active or passive emitter or by the areas of several emitters matched in respect of their period of operation and amplitude. The pulses occurring in the region of the focus are generated by a substantially unipolar and chronologically limited pressure and/or velocity evolution at the emitter surface. So that a substantially unipolar pressure pulse may equally be generated at the focus of an emitter surface of this nature, the emitter surface deviates in a specified manner from an ideally focussing emitter surface so that as a result of the differences in period of operation caused by a real deviation in the region of the focus, the chronological increase and decrease of the velocity potential in the focal region calculable by means of the Rayleigh integral differ in speed, so that the pressure evolution determined from the substantially unipolar evolution of the velocity potential by derivation based on time has a brief pulse of high amplitude at the beginning or end, which is followed or preceded by a longer pulse of lesser amplitude.

21 Claims, 14 Drawing Figures

SONIC TRANSMITTERS

BACKGROUND OF THE INVENTION

The invention relates to a sonic transmitter for generation of transient acoustic pulses, comprising a spatially curved focussing emitter surface, which is represented by the area of a single active or passive emitter or by the areas of several emitters matched in respect of their period of operation and amplitude, the pulses appearing in the focal area being engendered by a substantially unipolar and chronologically limited pressure and/or velocity evolution on the emitter surface.

DESCRIPTION OF THE PRIOR ART

Ideal focussing emitter surfaces, e.g. such as actively radiating spheroidal caps, spheroidal liquid lenses or illipsoids as passive reflectors are unsuitable to generate unipolar pulses, that is to say pulses having one positive or negative pressure stage only, since an emitter deflection suddenly imposed in the medium which is to be the sonic target, to the effect of a purely positive pressure surge on the emitter surface will in practice have the result that a negative pressure surge will always follow a positive pressure surge. This applies in the technically constantly applicable case that the dimensions of the emitter surface are finite.

Furthermore, the design of focussing emitters is also based on the assumption that the sonic pressure and the sonic speed are a maximum at the focus and will correspond to the pressure and speed conditions at the emitter surface. This is true moreover, for as long as cyclic signals are utilised. If the signals are not cyclic however, the aforesaid assumption is no longer applicable. For example, a spheroidal cap emitter acted upon by a unipolar positive Dirac surge will engender a bipolar Dirac surge at its focus.

There is a series of fields of application in which it is desirable to have a unipolar or at least largely unipolar pressure pulse at the focus. This applies, say, in medical technology in respect of contactless disintegration of kidney stones, in which negative pressure may lead to cavitation phenomena and thus to injuries to bodily tissue. Other fields of application for unipolar pulses are, for example, mensuration technology, materials testing and materials processing.

A few suggestions and works dealing with the generation of unipolar sonic pulses at the emitter itself or within the emission field, may be found in literature. There has however not as yet been any solution regarding the fundamental generation of unipolar sonic pulses in the emission field of focussing transducers.

SUMMARY OF THE INVENTION

It is an object of the invention to provide an emitter surface which converts a pulse at the emitter surface into a maximum power pulse at the focus with one polarity, whereas the amplitude of the pulse of the other polarity which is inevitably generated at the focus is intended to be as small as possible.

This problem may be resolved in theory, if a sudden change of speed is assumed to occur at the emitter surface. This does not however lead to a practicable and technically feasible solution, since the emitter surface placed in motion would in this case continue to move constantly, meaning that the deflection of the emitter surface would tend towards infinity.

A technically feasible solution could consequently consist only in a velocity graph having a finite time integral followed by an equally finite emitter deflection. Since a negative sonic pressure stage is already generated at the emitter surface itself however by means of a change of sign of the speed, it is necessary—amongst other factors—that the velocity graph of the emitter surface be made unipolar. A unipolar velocity graph at the emitter surface is still an inadequate condition in the case of an emitter having finite dimensions, as will be demonstrated in the following.

To this end, let us first consider the generation of preponderantly unipolar pressure pulses in the remote field, with reference to the uncomplicated example of a plane circular piston emitter situated in a hard and infinte sound panel. The known relationship $$p(t) = \rho \frac{d\phi}{dt}$$

is utilised to determine the pressure p(t) changing in the time t, $\delta$ being the density of the medium forming the sonic target and $\phi$ being the velocity potential which may be calculated from the Rayleigh integral $$\phi(\vec{r}, t) = \frac{1}{2\pi} \int \int v_6(s) \frac{1}{R} v\left(t - \frac{R}{c_o}\right) dS$$

In this connection r is the positional or darius vector locating the plotted point in the field, at which the time graph of the potential $\phi$ has its origin, $v\sigma$ is the velocity distribution on the emitter having the emitter surface S, $v\sigma =$ constant in the case of a plane rigid piston surface, R is the radius from an emitter surface element dS to the plotted point, v(t) is the time graph of the velocity at the emitter surface, and $c_o$ is the sonic speed of the transmission medium.

A positive velocity pulse at the emitter surface of the circular piston emitter considered as an example in this case as known provides a positive rectangular time plot of the velocity potential for a point plotted on the axis in the remote field, its differentiation based on time yielding a double pressure pulse changing the prefix sign. In this connection, the period of the potential time lapse diminishes with increasing distance of the plotted point from the emitter, so that $\phi t$ approximates a surge action. This means that the pressure p(t) then comprise a positive pulse and a negative pulse of identical magnitude following the former immediately.

Possibilities of rendering the pressure graph preponderantly unipolar for plotted points lying at a finite distance in front of an emitter, are known in the case of a plane emitter. This may be accomplished by means of a particular amplitude distribution of the speed at the emitter surface, e.g. such as Gaussian, liner, parabolic or sinusoidal distribution. What is primarily intended thereby is to obtain particular directional characteristics as well as a reduction of the negative sound pressure proportion during an energisation of the emitter with positive sonic pulses. The measures specified for generation of a unipolar pressure pulse at the focus are ineffective however in the case of focussing emitters.

So that a substantially unipolar pulse may now be generated at the focus by means of focussing emitters in accordance with the problem posed, the sonic emitter according to the invention, which had been referred to in the foregoing, is so constructed that the emitter surface deviates from an ideal focussing emitter surface in a specified manner such that the temporal increase and decrease of the velocity potential $\phi(t)$ calculable by means of the Rayleigh integral and caused in the area of the focus by the amplitude and operating period differences differ in speed at the focus and that the bipolar pressure graph p(t) obtained by derivation based on time from the practically unipolar evolution of the velocity potential has a brief pulse of great amplitude at the beginning or end, which is followed or preceded by a longer pulse of lesser amplitude.

The emitter surface may consequently be produced by spatial transformation of a non-planar finite emitter surface which engenders a substantially unipolar pressure pulse at a point in the remote field by means of a velocity jump or velocity pulse, the spatial transformation converting a plane circular area into a spherical cap area and the point lying on the axis in the remote field into the spherical cap centre, and the axes of symmetry merging into each other.

The emitter surface may to this end deviate from a spheroidal surface or spherical cap shape, in such manner that the spatial derivation of the spherical projection of the emitter surface on to the focus yields the same function as that engendered on a plane, equally by spatial derivation of the plane projection of a nonfocussing emitter generating substantially unipolar pulse in the remote field.

It is of special importance that the more slowly evolving velocity potential at the focus of the emitter surface according to the invention changes linearly or that the velocity potential follows a linear function, because the pressure generated then retains the minimum quantity $p_{min}$ possible upon reduction of $\phi_{max}$ to $\phi=0$ or upon increase of $\phi=0$ to $\phi_{max}$, whereas occasional surges $|p| > |p_{min}|$ are generated by any non-linear functions $\phi(t)$.

Emitter surfaces of sonic emitters which generate a surge function in particular, may be so constructed that the spatial derivation of the spherical projection of the emitter surface on to the focal point yields the same function which is optionally produced by means of the spatial derivation of the projection a. of a paraboloid, cone or spherical section having its axis extending at right angles to the projection surface.
b. of a sinusoidal body of revolution of a length of $\pi/4$, whereof the axis forms the abscissa of the sinusoidal function and extends at right angles to the projection surface, or
c. of an exponential body of revolution having its axis extending at right angles to the projection plane and having the cross-sectional area $S(x)=S_o \cdot E^{-\alpha x}$ on to a plane.

According to a special constructional principle for an emitter surface generating a surge function, the imaginary chronological increase and decrease of the shade area occurs at different speed, said shade area then being projected from the emitter surface to an imaginary invariable spherical surface whose centre is situated at the focus and simultaneously represents the locus of an imaginary projection light source point, whereas the period of penetration of the two surfaces is projected, the emitter surface being subjected to an imaginary uniform and merely raidal shrinkage in the direction towards the focus.

By contrast, emitter surfaces with which a pulse function in particular may be generated, may be so constructed that a single increase or decrease of the length of the intersection line engendered occuring at different speed may result upon intersection of the emitter surface with an imaginary spherical surface whose centre is situated at the focus and which expands with the radius increasing linearly in time. On the other hand, the construction of the emitter surface generating a pulse function may also have been undertaken in such manner that the spatial derivation of the spherical projection of the emitter surface on to the focal point yields the same function as that which is obtained by spatial derivation of the projection of a hyperboloid surface, preferably of a spherical surface or of a conical surface, whose axis extends at right angles to the projection surface, on to a plane.

In principle, these solutions as specified are based on the idea that the essentially known discoveries regarding the transient action of the pressure in the remote field of a finite place emitter may be transformed into the transient behaviour of the pressure at the focus of a spherical emitter, e.g. a spheroidal cap, and that a finite and specifically non-planaremitter surface may be transformed thereafter into a specifically non-spherical emitter surface. Some practical methods of construction are to be introduced in the following. These initially consist of spatial surfaces deviating spherically on the one hand and conically on the other hand from an ideal focussing emitter surface, e.g. such as a spherical surface which will consequently no longer be ideal focussing emitter surfaces.

For example, let bodies of revolution be taken as a basis, whereof the pressure theoretically engendered in the remote field extends in sawtooth form, when these bodies of revolution are exposed to a theoretical velocity surge in axial direction. Such bodies of revolution consist of hemispheres or vertical circular-section cones, amongst other. The maximum pressure generated in the remote field is then proportional to the maximum cross-sectional area of these bodies of revolution.

The concave or convex body of revolution is subdivided in imagination and at right angles to its axis into small differential panels having the cross-sectional surfaces $A_i$, and these are projected one after another on to a plane extending at right angles to the axis, obtaining a function $A_i(t_i)$ by this means. To this end, the time $t_i$ should be assumed to amount to between nought and $L/c_o$, L being the axial length of the body of revolution and $c_o$ the sonic speed of the ambient medium.

The function $A_i(t_i)$ is then projected spherically onto a spheroidal cap of imaginary nature and having the radius R, in such manner that at $t_i=0$, the zenith of the spheroidal cap is just being impinged upon, and that for $t=L/c_o$ it is the cap rim which is just being impinged upon by the projection. After an 1/R correction which is still needed, a spatial surface or emitter surface is described thereby, which at the focus of the imaginary cap, that is to say-at the non-ideal focal point of the emitter surface according to the invention—generates the same pressure graph during a theoretical velocity surge as that which would have been generated at a plotted point in the remote field by menas of the body of revolution utilised to construct the emitter surface. In principle, and as already stated, the available information regarding the transient behaviour of the pressure in the remote field of a finite emitter deviating in specific manner from the plane form is transformed to the transient behaviour of the pressure at the focus of a focussing emitter deviating in specific manner from the spheroidal cap. This also means that the plotted point situated at infinity on the axis of a plane circular emitter is transformed into the focus of a circulatory rimmed cap emitter, and the plane surface is transformed spherically into the cap surface. At the same time, this also means that the ideal focussing emitter surfaces referred to in numerous patents and other publications, such as spherical, ellipsoidal and parabolic surfaces or their equivalents, have the worst imaginable properties for generation of unipolar sonic pressure pulses.

If the emitter surface discovered in this manner is then energised in such manner that a velocity surge occurs on it, a pressure p(t) then results at the focus, which corresponds to the chronological derivation of the evolution of $A_i(t_i)$ which in the example considered increases non-linearly according to quadratic functions. In the case of the example of the auxiliary hemispherical surface, a very steep positive pressure rise to a high amplitude will thus occur, which is followed by a linear pressure drop of longer duration.

In the example of the auxiliary circular cone surface, a slow linear rise of the pressure will occur which drops to zero almost instantaneously. If, in the example considered, the emitter surface thus discovered is energised in such manner that a velocity surge occurs thereat, a pressure p(t) then occurs at the focus which corresponds to the chronological derivation of the evolution of p(t) under surge energisation and to the second chronological derivation of $A_i(t_i)$. What will thus occur in this case is a positive pressure surge of great amplitude which is followed by a more protracted constant and smaller negative pressure outline (auxiliary spherical surface). Conditions which are reversed chronologically and prefix-wise, occur in the case of an auxiliary conical surface.

Conditions in which a low negative pressure evolution occurs initially, and then a high positive pressure surge, or conditions in which a high negative surge occurs first and then a low positive pressure pulse, are thus the corresponding result of an antipolar energisation of the velocity at the emitter surface.

The chronological sequence as well as the polarity of the brief high sonic pulse may be determined by a correspondingly different arrangement of the surfaces utilised for construction, for example an inverted cone instead of a cone. In the comparative example considered, a velocity surge energisation causes a positive unipolar sawtooth pulse having a steep leading flank instead of a steep trailing flank, and a velocity pulse energisation causes a strong positive surge followed by a small protracted negative pressure instead of a small protracted positive pressure pulse, which is terminated by a high negative pressure surge. Furthermore, an emitter surface may be constructed in a corresponding manner if, for example, a paraboloid whose axis extends at right angles to the projection surface, is utilised as a constructional component instead of a cone or sphroidal cap. Other constructional possibilities under application of a sinusoidal bodies of revolution or exponential bodies of revolution, were already referred to in the foregoing.

An appropriate solution for an emitter surface generating a velocity pulse also results from a deviation from an imaginary spheroidal cap surface transformed on the basis of a hyperboloid according to the aforesaid method of construction. A pressure pattern is engendered thereby at the focus, which begins with a small pulse, follows on with a more protracted pressure stage of identical polarity, and is terminated by a very high, brief antipolar pulse. If the apex of the generating hyperboloid is moreover converted into a cone by means of an even transition, it is possible to attenuate the small initial pulse.

Emitter surfaces evidently also exist which do not appear to be appropriate to generate preponderantly unipolar pulses under the action of a velocity pulse. Amongst these should be counted the emitter surfaces devised on the basis of a paraboloid or of an exponential body of revolution, which may consequently be utilised only under energisation of velocity surges at their surfaces.

BRIEF DESCRIPTION OF THE DRAWINGS

Further objects and advantages of the invention will become clear in the following detailed description thereof, taken in conjunction with the accompanying drawings in which preferred embodiments of the invention are illustrated by way of example.

In the drawings.

DETAILED DESCRIPTION OF THE PREFERRED EMBODIMENTS

Figure 1:
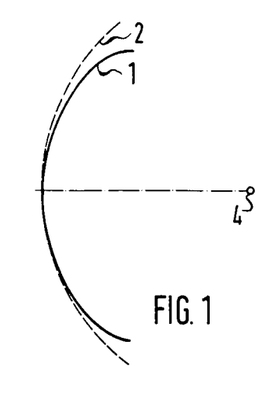
FIG. 1 shows diagrammatically an emitter surface in accordance with the first embodiment.

FIG. 1 shows an emitter surface 1 according to the invention, which may be constructed in a manner described earlier on the basis of the spherical projection of a conical projection surface and deviates in a specified manner from the emitter surface 2 which is ideally focussed on the focal point 4.

Figure 2:
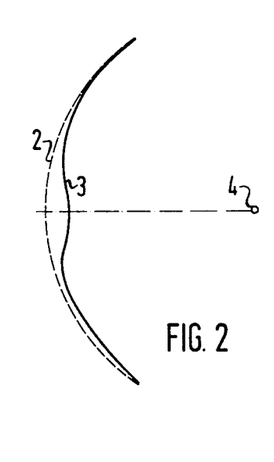
FIG. 2 shows diagrammatically an emitter surface in accordance with the second embodiment.

The emitter surface illustrated in FIG. 2 may be constructed on the basis of the spherical projection of a spherical or conical projection surface, and in accordance with the illustration deviates from the spherical surface 2 ideally focussed on the focal point 4.

Figure 3:
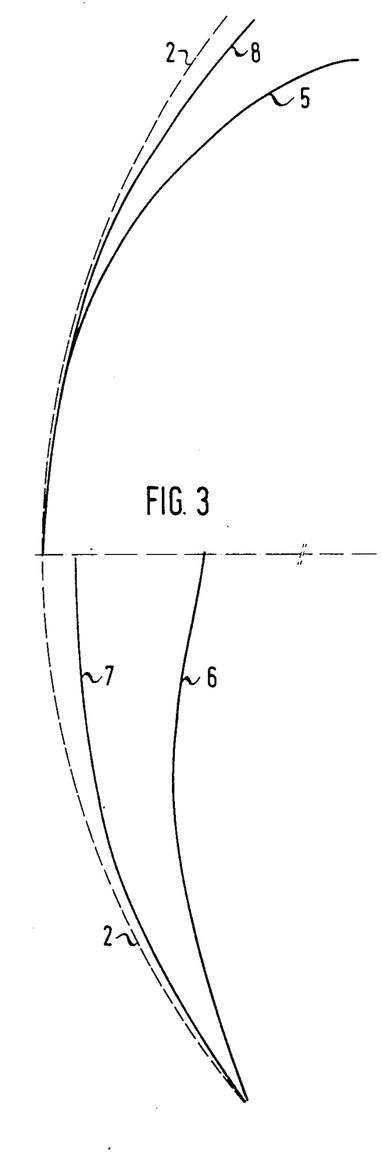
FIG. 3 shows diagrammatically four further emitter surfaces in accordance with the invention.

The four emitter surfaces shown in FIG. 3 deviate in such a way from the ideally focussed emitter surface or spherical surface 2, that in case of an energisation by means of a velocity pulse in the direction towards the focus 4, what is obtained at the latter is a slow rise and a rapid decay of the velocity potential $\phi(t)$. The emitter surfaces 5 and 6 on the one hand and 7 and 8 on the other hand will in each case be equal in their action, in which connection the emitter surfaces 5 and 6 will generate lower pressure at the focus 4 than the surfaces 7 and 8. Identical results may consequently also be secured in principle, with different structural forms of the emitter surfaces.

Figure 4:
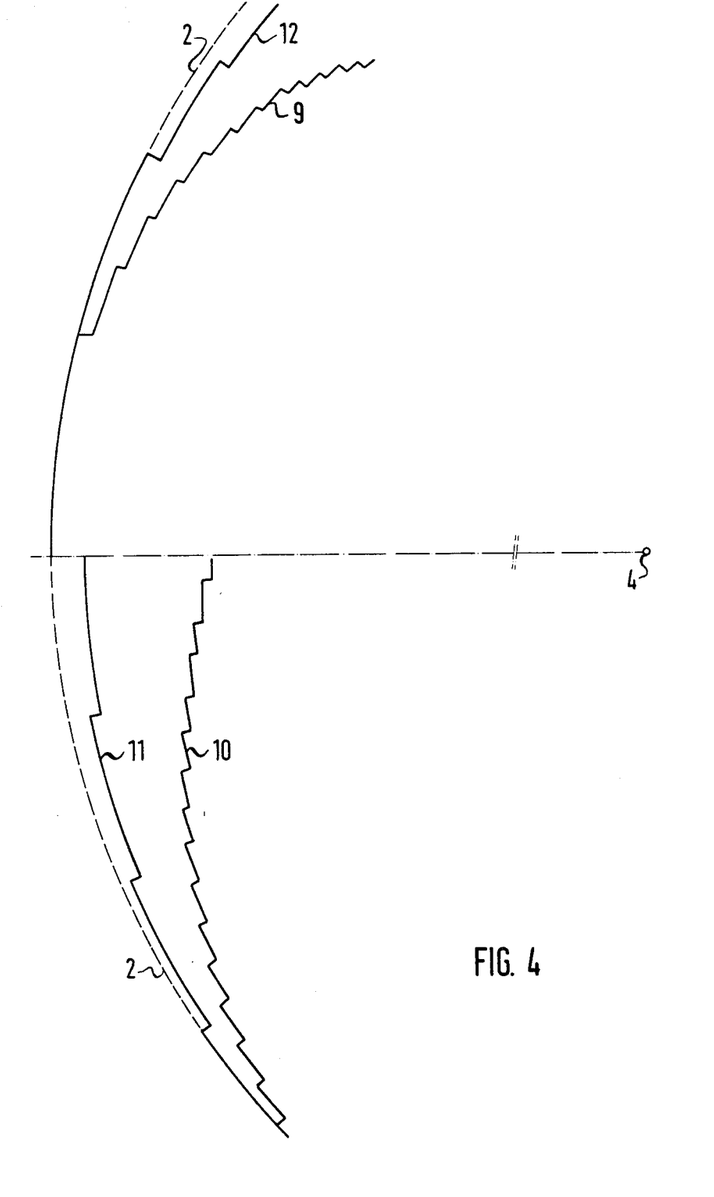
FIG. 4 shows four stepped emitter surfaces in accordance with the invention.

Step-like surfaces 9,10,11 and 12 were selected in the embodiments according to FIG. 4, which in their structure and action substantially approximate the emitter surfaces 5 to 8 according to FIG. 3. The acceptable height of the steps is then proportional to the duration of the desirable and substantially unipolar pulses in the area of the focus 4, on which is ideally focussed the spherical surface 2 utilised as a constructional aid.

Graphs of potential $\phi_F$ against time alongside the graphs of the corresponding pressure $p_F$ indicated in the area of the focus for the emitter surfaces in FIGS. 1 to 4 and either acted upon by or emitting, a velocity pulse in the direction of the focus 4, are illustrated in FIG. 5. In this connection, FIG. 5a shows the graphs for the ideally focussing emitter 2 or for its technical equivalent. It is apparent that a bipolar pressure pulse is generated.

Figure 5A:
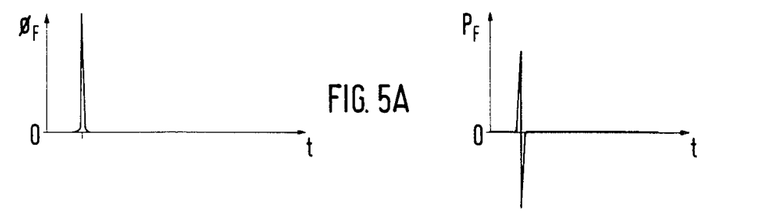
FIG. 5a shows velocity potential $\phi_F$ and pressure $p_F$ plotted against time for an ideally focussing emitter as shown for example in FIGS. 1 to 4.
Figure 5B:
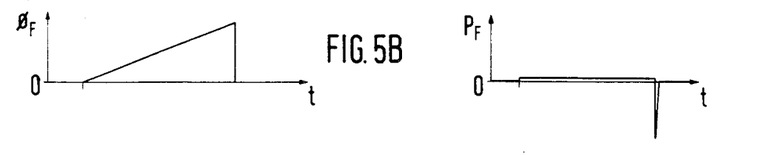
FIGS. 5b to 5f show velocity potential $\phi_F$ and pressure $p_F$ plotted against time for various emitter surfaces in accordance with the invention shown in FIGS. 1 to 4.
Figure 5C:
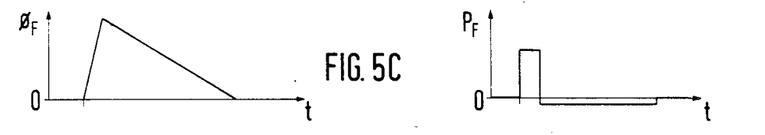
Figure 5D:
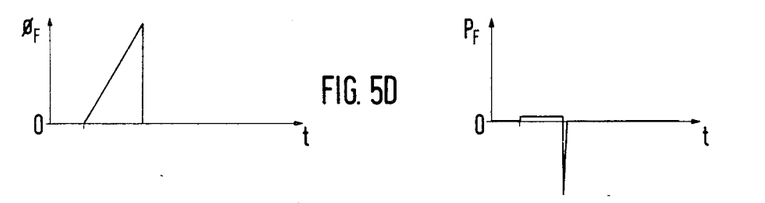
Figure 5E:
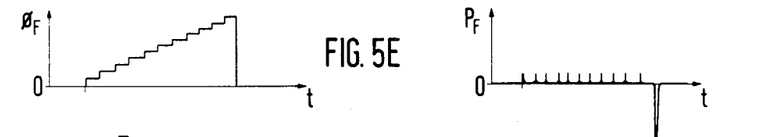
Figure 5F:
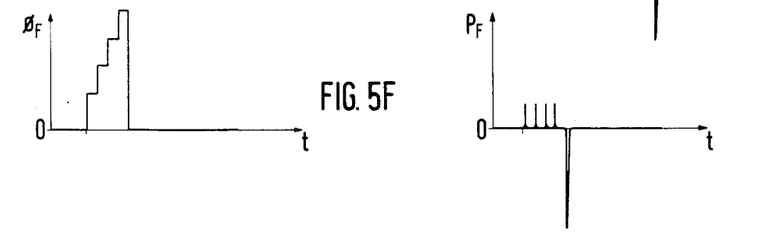

The chronological evolutions according to FIGS. 5b to f apply for non-ideally focussing emitter surface according to the invention, in which connection it is apparent that preponderantly unipolar pressure pulses occur in the area of the focus. FIG. 5b illustrates the chronological evolutions of the potential and pressure for the emitter surfaces 1,5 and 6. Furthermore, the graphs according to FIG. 5c apply for the emitter surface 3, the graphs according to FIG. 5d apply for the emitter surfaces 7 and 8, the graphs according to FIG. 5e apply for the emitter surfaces 9 and 10, and the graphs according to FIG. 5f finally apply for the emitter surfaces 11 and 12.

Figure 6:
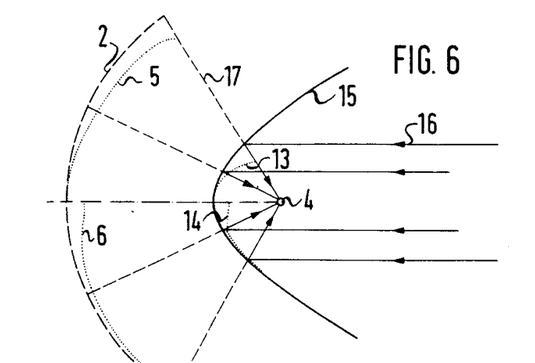
FIG. 6 shows diagrammatically how two emitter surfaces in accordance with the invention differ from a parabolic reflector surface.

The specified manner in which emitter surfaces 13 and 14 of the invention deviate from the surface of a parabolic reflector 15 ideally focussed on the focal point 4, is shown in FIG. 6. It is also plain from this illustration that the reflector 15—together with the just incident sonic wave 16—is the emitter surface equivalent to the spherical cap 2 having a concentric spherical wave 17. For the purpose of illustration the emitter surfaces or reflection sources 2 and 5, are shown radially displaced towards the left. Furthermore, this illustration also demonstrates the construction of the emiter surfaces or "substitue emitter surfaces" 13,14, which deviate from the parabola and may be derived from the emitter surfaces 5,6.

Figure 7:
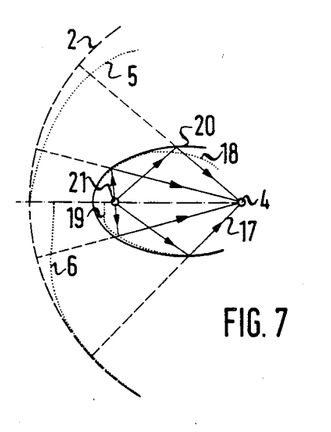
FIG. 7 illustrates two further emitter surfaces in accordance with the invention and their deviation from an ideally focussing ellipsoidal reflector.

FIG. 7 illustrates non-ideally focussing emitter surfaces 18,19 according to the invention, which are apparent from the emitter surfaces 5,6 which for their part again deviate in a specified manner from the ideally focussing emitter surface 2. The ellipsoidal surface 20, together with the spherical waves departing from the point source 21, forms the emitter surface equivalent of the surface 2.

In the figures described above, the emitter surfaces are visible in cross-section and are illustrated in simplified manner only by solid, dotted or dash-dotted lines and distances. Furthermore, some emitter surfaces have been shown in the form of the top or bottom half only, although it is understood that rotationally symmetrical structures are intended in these cases.

Figure 8:
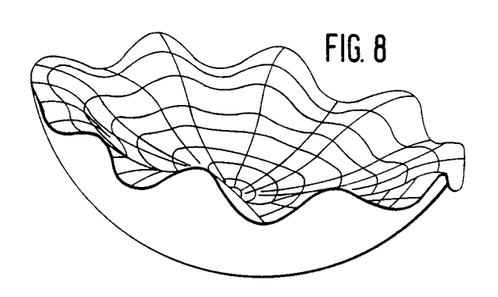
FIG. 8 shows an emitter surface in accordance with a further embodiment of the invention.

Emitter surfaces which are not rotationally symmetrical and do not focus in an ideal manner may however also be constructed according to the invention, that is to say for example in the form of emitters which in accordance with FIG. 8 represent a concave bowl scalloped in the marginal portion above all. Examples for the construction of these and analogous structures are described in the following, a distinction being drawn between an emitter surface acted upon by a velocity pulse and one acted upon by a velocity surge.

In the case of the emitter surfaces generating a pulse function, it may be counted as a constructional criterion that an intersection between the emitter surface and an imaginary spherical surface expanding with a chronologically and linearly increasing radius, whose centre lies at the focus, results in a single increase or decrease occurring at varying speed, of the intersection line length produced, In particular, the spatial derivation of the spherical projection of the emitter surface on to the focal point can result in the same function as that generated by the spatial derivation of the projection of a hyperboloidal surface, whose axis extends at right angles to the projection surface, on to a plane.

Figure 9:
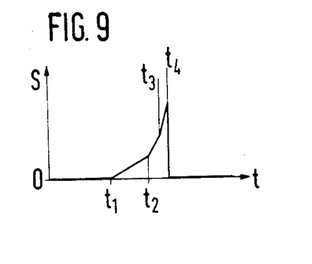
FIG. 9 shows the intersection line length S plotted against time t for an emitter in accordance with the invention.
Figure 10:
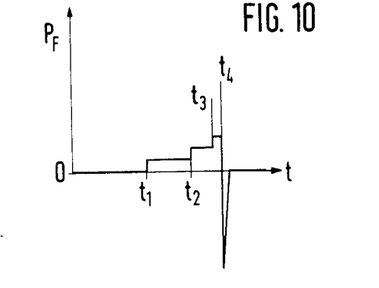
FIG. 10 shows the pessure $p_F$ plotted against time t for an emitter in accordance with the invention.
Figure 11:
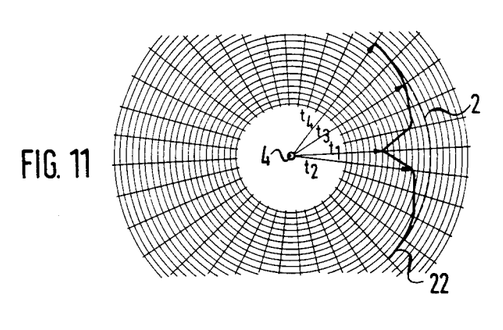
FIG. 11 shows diagrammatically a spherical surface used as a constructional aid in conjunction with FIGS. 9 and 10.

These connections may be described more clearly with reference to FIGS. 9 to 11. If, for example, the chronological pressure graph $p_F$ according to FIG. 10 is or is intended to be obtained at the focus of the emitter surface, the corresponding intersection line length S whose course in this case is shown by FIG. 9, is determined by the relationship $S = \int p(t)dt$. The spherical surface utilised as a constructional aid and expanding with a chronologically linearly increasing radius is indicated by concentric circles in FIG. 11, whose centre lies at the focus 4. The time axis t may be assumed in FIG. 11 as the lines departing radially from the focus for the times $t_1$ to $t_4$.

From a comparison of the operations corresponding to FIGS. 9 and 11, it is apparent that the expanding spherical surface does not initially intersect the rotationally symmetrical emitter surface 22, so that the intersection line length remains zero until the spherical surface reaches the circular cone apex of the emitter surface at the time $t_1$. The intersection line length then continues to increase slowly until the base surface of the cone is reached at $t_2$ by the spherical surface, thereupon increasing more rapidly via $t_3$ until it reaches the rim of the emitter surface at $t_4$, at which the intersection line length has its maximum. Immediately thereafter, the intersection line length drops to zero. The emitter surface 2 shown pecked in FIG. 11 is a spheroidal cap focussed in ideal manner on the focal point 4.

Conversely, it is evidently also possible to determine the pressure evolution at the focus according to FIG. 10 from the evolution of the intersection line length S in FIG. 9 by chronological derivation of the intersection line length. A substantially unipolar and negative pressure pulse is the result in any case at the instant $t_4$.

Figure 12:
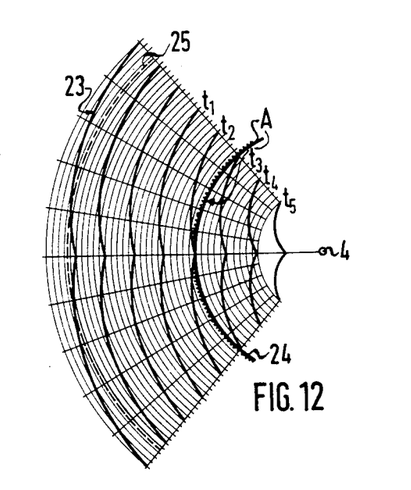
FIG. 12 illustrates diagrammatically a surge function generated by an emitter surface in accordance with the invention.

The construction of the emitter surface 23 according to FIG. 12 generating a surge function may be envisaged in such manner that the imagined chronological increase or decrease of the shade surface A occurs at varying speed, said shade surface then being projected by the emitter surface 23 on to an imaginary invariable spherical surface 24 whose centre lies at the focus 4 and simultaneously represents the locus of an imaginary projection light source point during the period of interpenetration of the two areas, the emitter surface being exposed during this action to an imaginary uniform and merely radial spherical shrinkage in the direction of the focus.

Figure 13:
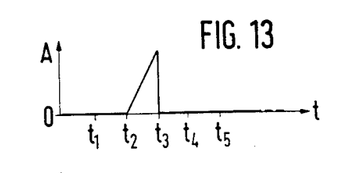
FIG. 13 shows the area of shaded surface A of FIG. 12 plotted against time.
Figure 14:
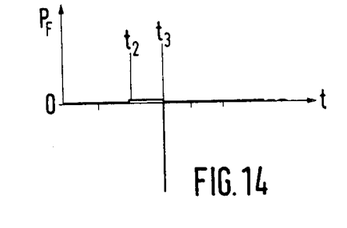
FIG. 14 shows pressure $p_F$ plotted against time for the emitter surface of FIG. 12.

Five chronologically different conditions have been denoted by $t_1$ to $t_5$. FIG. 13 illustrates the chronological evolutions of the shade surface A generated during the said interpenetration, which occurs only between the times $t_2$ and $t_3$ in the case considered. The relationship $A(t) = \int p(t)dt$ is applicable moreover for the shade area, which means that the shade area may be determined by temporal integration of the pressure evolution according to FIG. 14 or that this substantially unipolar pressure graph may be determined by differentiation of the shade area evolution A. A comparison between the emitter surface 23 thus constructed and the emitter surface 25 shown pecked and focussing in an ideal manner elucidates the differences and deviations in the evolution of the two surfaces.

The emitter surfaces 22,23 were merely shown as lines, according to the invention, in both previously discussed cases also, to simplify matters. These are rotationally symmetrical emitter surfaces however, in this case.

Furthermore, the emitter surface according to the invention may also be constructed and assembled from partial areal sections or by the combination of differently constructed partial areal sections. For example, the one half of the emitter surface may correspond to area 5 and the other half to the area 6 (FIG. 3), in which connection it should be observed that the periods of sound travel from the areal sections closes to the focus 4 to said focus should be of equal length. The same applies for the sound travel periods from the areal sections situated farthest away from the focus. An appropriate combination of parts of the emitter surfaces 7 and 8 is equally possible. On the contrary, a combination of parts of the areas 8 and 8 or 5 and 7 will not lead to the required results.

It is also pointed out in conclusion that the emitter surfaces according to the invention may form part of active or passive emitters. An inactive emitter surface may for example comprise at least one acoustic reflector, an acoustic lens or other sound beaming means. In the case of active emitter surfaces, these are energised by means of at least one active transducer, in particular by means of a mechanical, hydraulic, electrical, piezoelectric, electrostatic, electrostrictive, magnetic, dynamic, electromagnetic or thermic transducer, or by means of an explosive, impact element, eddy current, incandescent wire, laser pulse or arc gap transducer.

What is claimed is:

1. In a sound transmitter for generation of transient acoustic pulses, comprising a spatially curved focussing emitter surface which is represented by the area of at least one emitter, provided that where a plurality of emitters are used they are matched in respect of their period of operation and amplitude, the pulses generated in the focussed volume being engendered by a substantially unipolar and chronologically limited pulse on the emitter surface, an improvement characterised in that the emitter surface deviates from an ideal focussing emitter surface in such a way that as a consequence of the differences in the periods of operation caused by the areal deviation, the chronological rise and fall in the region of the focus of the velocity potential $\phi(t)$ calculable by means of the Rayleigh integral differ in speed in the region of the focus and that the bipolar pressure pulse $p(t)$ determined by derivation based on time from the substantially unipolar evolution of the velocity potential comprises a brief pulse of high amplitude and an adjacent longer pulse of lower amplitude.

2. Sound transmitter as claimed in claim 1, wherein said emitter surface is produced by spatial transformation of a finite and non-planar emitter surface which by means of a high-speed variation generates a substantially unipolar pressure pulse at a point in the remote field, the spatial transformation converting a plane circular area into a spheroidal cap surface and the point situated on the axis in the remote field into the centre of the spheroidal cap, whilst the axes of symmetry merge into each other.

3. Sound transmitter as claimed in claim 1, which comprises an emitter surface generating a high-speed variation and wherein said emitter surface deviates from a spheroidal surface or spheroidal cap shape in such a way that the spatial derivation of the spherical projection of the emitter surface results in the same function at the focus as that engendered by spatial derivation of the plane projection of a non-focussing emitter generating a substantially unipolar pressure pulse in the remote field, on a plane.

4. Sound transmitter as claimed in claim 3, comprising an emitter surface generating an approximated high-speed variation function, wherein the spatial derivation of the spherical projection of the emitter surface on the focal point yields the same function as that produced optionally by the spatial derivation of a projection selected from a paraboloid, cone and spherical sections having its axis placed at right angles to the projection surface.

5. Sound transmitter as claimed in claim 3, comprising an emitter surface generating an approximated high-speed variation function, wherein the spatial derivation of the spherical projection of the emitter surface on the focal point yields the same function as that produced optionally by the spatial derivation of a projection of a sinusoidal body of rotation having a length of $\pi/4$, whose axis forms the abscissa of the sinusoidal function and extends at right angles to the projection surface.

6. Sound transmitter as claimed in claim 3, comprising an emitter surface generating an approximated high-speed variation function, wherein the spatial derivation of the spherical projection of the emitter surface on the focal point yields the same function as that produced optionally by the spatial derivation of a projection of an exponential body of rotation having the cross-sectional area $S(x) = S_o \cdot E^{-\alpha x}$ and having its axis extending at right angles to the projection surface, on to a plane.

7. Sound transmitter as claimed in claim 2, comprising an emitter surface generating a high-speed pulse function, wherein upon intersection of the emitter surface with an imaginary spheroidal surface expanding with a chronologically linearly increasing radius ($t_1-t_4$) whose centre is situated at the focus, there results a change in the intersection line length (S) occurring once at varying speed.

8. Sound transmitter as claimed in claim 3, comprising an emitter surface generating a high-speed pulse function, wherein the spatial derivation of the spherical projection of the emitter surface on to the focal point yields of same function as that produced by spatial derivation on to a plane of the projection of a hyperboloid surface, whose axis extends at right angles to the projection surface.

9. Sound transmitter as claimed in claim 8, wherein said surface is a spheroidal surface.

10. Sound transmitter as claimed in claim 8, wherein said surface is a conical surface.

11. Sound transmitter as claimed in claim 3, comprising an emitter surface generating a high-speed variation function, wherein a contemplated chronological variation of a shade area between said emitter surface and said focus occurs at varying speed, said area then being projected by the emitter surface on to an imaginary invariable spherical surface whose centre lies at the focus and simultaneously represents the locus of an imaginary light source projection point during the period of penetration of the two areas, the emitter surface being exposed to an imaginary uniform and merely radial shrinkage in the direction towards the focus.

12. Sound transmitter as claimed in claim 3, wherein said emitter surface has a different shape in different partial areas thereof.

13. Sound transmitter as claimed in claim 1, characterised in that the more slowly evolving velocity potential $\phi(t)$ varies linearly.

14. Sound transmitter as claimed in claim 1, characterised in that the inactive emitter surface comprises at least one sound-concentrating means.

15. Sound transmitter as claimed in claim 14, wherein said sound-concentrating means comprises an acoustic reflector.

16. Sound transmitter as claimed in claim 14, wherein said sound-concentrating means comprises an acoustic lens.

17. Sound transmitter as claimed in claim 1, wherein said chronologically limited pulse comprises a pressure evolution.

18. Sound transmitter as claimed in claim 1, wherein said chronologically limited pulse comprises a speed evolution.

19. Sound transmitter as claimed in claim 1, wherein said brief high amplitude pressure pulse comes at the beginning of said bipolar pulse and is followed by said longer pulse of lower amplitude.

20. Sound transmitter as claimed in claim 1, wherein said brief high amplitude pulse comes at the end of said bipolar pulse and is preceded by said longer pulse of lower amplitude.

21. Sound transmitter as claimed in claim 1, wherein said emitter surface is energised by means of at least one active transducer.

* * * * *